United States Patent
Bouscaren

(10) Patent No.: US 12,140,498 B2
(45) Date of Patent: Nov. 12, 2024

(54) METHOD FOR AUTHORISING UPDATING OF A MAGNETIC SENSOR FOR A COMBUSTION ENGINE WITH IMMUNITY TO MAGNETIC DISTURBANCES

(71) Applicant: Continental Automotive GmbH, Hannover (DE)

(72) Inventor: Denis Bouscaren, Toulouse (FR)

(73) Assignee: Continental Automotive GmbH, Hannover (DE)

( * ) Notice: Subject to any disclaimer, the term of this patent is extended or adjusted under 35 U.S.C. 154(b) by 344 days.

(21) Appl. No.: 17/432,274

(22) PCT Filed: Feb. 25, 2020

(86) PCT No.: PCT/EP2020/054921
§ 371 (c)(1),
(2) Date: Aug. 19, 2021

(87) PCT Pub. No.: WO2020/173947
PCT Pub. Date: Sep. 3, 2020

(65) Prior Publication Data
US 2022/0252484 A1    Aug. 11, 2022

(30) Foreign Application Priority Data
Feb. 26, 2019   (FR) ..................... 1901954

(51) Int. Cl.
*G01D 5/12* (2006.01)
*G01D 5/244* (2006.01)
*G01M 15/06* (2006.01)

(52) U.S. Cl.
CPC ........ *G01M 15/06* (2013.01); *G01D 5/24438* (2013.01)

(58) Field of Classification Search
CPC ................................................. G01D 5/24428
See application file for complete search history.

(56) References Cited

U.S. PATENT DOCUMENTS 4,902,970 A * 2/1990 Suquet ............... G01P 21/02
327/100
5,231,351 A   7/1993 Kordts et al.
(Continued)

FOREIGN PATENT DOCUMENTS

| CN | 1670484 A | 9/2005 |
| CN | 1702309 A | 11/2005 |

(Continued)

OTHER PUBLICATIONS

English Translation of Written Opinion for International Application No. PCT/EP2020/054921, dated Apr. 28, 2020, 6 pages.
(Continued)

*Primary Examiner* — John E Breene
*Assistant Examiner* — Alex T Devito
(74) *Attorney, Agent, or Firm* — Buchanan Ingersoll & Rooney PC

(57) ABSTRACT

A method for authorizing an update of a switching threshold of a magnetic-field sensor for an internal combustion engine of a motor vehicle, in order to ensure an immunity of the sensor to external magnetic disturbances. The sensor detects magnetic-field variations induced by a passage of the teeth of a target in proximity to the sensor, by generating a magnetic signal exhibiting oscillations, certain of which may be due to magnetic disturbances and be not to be taken into account in the update by the sensor of the switching threshold, which is recomputed depending on a detected amplitude of at least two consecutive oscillations of the magnetic field. An update of the switching threshold is suspended when an oscillation frequency computed between the at least two consecutive oscillations is higher than a maximum oscillation frequency computed from a predetermined speed of rotation of the engine and from the number of teeth on the target.

8 Claims, 5 Drawing Sheets

(56) References Cited

U.S. PATENT DOCUMENTS

| | | | |
|---|---|---|---|
| 5,265,037 A * | 11/1993 | Izumi | G01P 3/489 |
| | | | 702/148 |
| 5,487,009 A | 1/1996 | Hill | |
| 5,505,267 A * | 4/1996 | Orbach | B60T 11/103 |
| | | | 172/3 |
| 6,320,373 B1 | 11/2001 | Strasser | |
| 6,674,279 B2 | 1/2004 | Manlove et al. | |
| 6,967,476 B2 | 11/2005 | Block et al. | |
| 6,990,415 B2 | 1/2006 | Köpken | |
| 7,000,598 B2 | 2/2006 | Sheikh et al. | |
| 7,119,532 B2 | 10/2006 | Nihei et al. | |
| 7,141,967 B2 * | 11/2006 | Butzmann | G01R 33/09 |
| | | | 324/252 |
| 7,205,761 B2 | 4/2007 | Tsukamoto et al. | |
| 7,262,591 B2 | 8/2007 | Blossfeld | |
| 9,410,979 B2 | 8/2016 | Yuen et al. | |
| 9,500,465 B2 | 11/2016 | Rolew et al. | |
| 9,644,997 B2 | 5/2017 | Carbonne et al. | |
| 10,103,551 B2 | 10/2018 | Hopperdietzel | |
| 10,215,591 B2 | 2/2019 | Mirassou et al. | |
| 10,267,657 B2 | 4/2019 | Mirassou et al. | |
| 10,330,749 B2 | 6/2019 | Bandiera | |
| 10,432,194 B2 | 10/2019 | Bar et al. | |
| 11,740,116 B2 | 8/2023 | D'Angelico et al. | |
| 2014/0333295 A1 | 11/2014 | Fernandez et al. | |
| 2018/0248545 A1 | 8/2018 | Bar et al. | |

FOREIGN PATENT DOCUMENTS

| | | | |
|---|---|---|---|
| CN | 103842839 A | 6/2014 | |
| CN | 104266700 A | 1/2015 | |
| CN | 105157558 A | 12/2015 | |
| CN | 105433949 A | 3/2016 | |
| CN | 107209233 A | 9/2017 | |
| CN | 107925405 A | 4/2018 | |
| CN | 109313060 A | 2/2019 | |
| DE | 2 032 191 A1 | 1/1972 | |
| DE | 40 30 085 A1 | 3/1992 | |
| DE | 4035370 A1 * | 5/1992 | |
| DE | 102 22 205 A1 | 11/2003 | |
| DE | 10 2010 064 203 A1 | 6/2012 | |
| DE | 10 2014 214 246 B3 | 7/2015 | |
| EP | 0 863 384 A1 | 9/1998 | |
| FR | 2821521 A1 | 8/2002 | |
| JP | 07270439 A | 10/1995 | |
| JP | 2004-245794 A | 9/2004 | |
| JP | 4752095 B2 * | 8/2011 | G05B 19/042 |
| SU | 993125 A2 | 1/1983 | |
| WO | 02/23204 A1 | 3/2002 | |
| WO | 2017/045747 A1 | 3/2017 | |

OTHER PUBLICATIONS

International Search Report and Written Opinion for International Application No. PCT/EP2020/054921, mailed Apr. 28, 2020, with partial English translation, 9 pages.

International Search Report and Written Opinion for International Application No. PCT/EP2020/054921, mailed Apr. 28, 2020, 12 pages (French).

Jlassi et al., "A Robust Observer-Based Method for IGBTs and Current Sensors Fault Diagnosis in Voltage-Source Inverters of PMSM Drives", IEEE Transactions on Industry Applications, (May-Jun. 2017), vol. 53, Issue 3, pp. 2894-2905.

Ma et al., "Design of the New Electronic Magnetic Compass", Journal of Xidian University, (Jun. 2008), vol. 35, No. 3, pp. 495-498. (with English abstract).

Wang et al., "Research on Wide-band Measuring Rotation Speed System Based on Magnetoelectric Rotational Speed Sensor", Instrument Technique and Sensor, (Mar. 15, 2017), No. 3, pp. 86-89. (with English abstract).

Zhao et al., "A Bidirectional Acceleration Switch Incorporating Magnetic-Fields-Based Tristable Mechanism", IEEE/ASME Transactions on Mechatronics (Feb. 2013), vol. 18, Issue 1, pp. 113-120.

Office Action (Notification to Grant Patent Right for Invention) issued Mar. 7, 2024, by the State Intellectual Property Office of People's Republic of China in corresponding Chinese Patent Application No. 202080016655.1 and an English translation of the Office Action. (9 pages).

\* cited by examiner

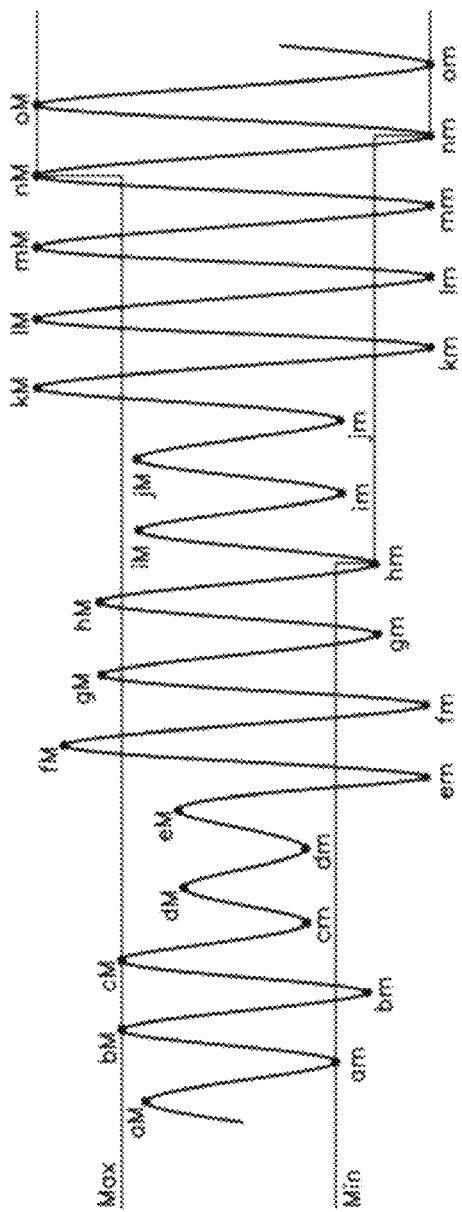

METHOD FOR AUTHORISING UPDATING OF A MAGNETIC SENSOR FOR A COMBUSTION ENGINE WITH IMMUNITY TO MAGNETIC DISTURBANCES

CROSS REFERENCE TO RELATED APPLICATIONS

This application is the U.S. National Phase Application of PCT International Application No. PCT/EP2020/054921, filed Feb. 25, 2020, which claims priority to French Patent Application No. 1901954, filed Feb. 26, 2019, the contents of such applications being incorporated by reference herein.

FIELD OF THE INVENTION

The present invention relates to a method for authorizing an update of a switching threshold of a magnetic-field sensor for an internal combustion engine of a motor vehicle, in order to ensure an immunity of the sensor to magnetic disturbances.

Such a magnetic-field sensor may be a sensor of the magnetic field of a camshaft or crankshaft by way of driven element associated with the internal combustion engine.

BACKGROUND OF THE INVENTION

Camshaft sensors are used in a motor vehicle to determine the position of the various cylinders in the combustion cycle of the internal combustion engine, i.e. to determine whether each cylinder is in intake mode, in compression mode, in combustion mode or in exhaust mode.

Likewise, crankshaft sensors are used to track the rotation of the crankshaft, the association of these two sensors allowing the internal combustion engine to be synchronized. The magnetic-field sensors that are the subject of the present invention may also perform other functions, such as, for example, when used as a knock sensor.

The synchronization of an internal combustion engine consists in identifying with precision the position of the moving parts of the engine assembly and associated elements, namely each piston housed in one engine cylinder, the crankshaft, and the camshaft that is responsible for managing intake into and exhaust from the combustion chamber given the type (two-stroke or four-stroke) of engine, in order to allow the engine control electronics, which are integrated in an electronic control unit, to manage the engine with the accuracy and precision required for its optimal operation.

Therefore, an internal combustion engine must be "phased" in order to determine and optimize the best moment to burn the fuel in the cylinder, this allowing, inter alia, emissions and fuel consumption to be optimized.

Phasing is generally carried out by combining two pieces of information delivered by sensors associated with a crankshaft and a camshaft, respectively.

A magnetic sensor delivers a digital signal to a central computer for processing, the computer forming part of an electronic control unit.

As known, such a magnetic-field sensor is associated with a target secured to a camshaft. This target takes the form of a disk, the periphery of which is toothed. These teeth in general have the same height but may have different spacings (recesses) and different lengths, so as to encode (as known per se) the position of the cylinders in the combustion cycle of a motor-vehicle internal combustion engine.

The means for detecting the magnetic field, which is present in the sensor, detects the passage of the teeth of the target in front thereof and the resulting signal allows the position of each cylinder with respect to the combustion cycle of the engine to be determined, in a way known per se.

In order to determine the position of each cylinder in the engine cycle, the curve of the variations in the magnetic field perceived by the magnetic-field sensor during one revolution of the target is observed. This curve exhibits a succession of crenels, each corresponding to one tooth of the target. For example, for a camshaft sensor, by measuring the spacing between each crenel and the duration of each thereof, it is possible to determine the position of each cylinder with respect to the engine combustion cycle.

To this end, for any magnetic-field sensor, it is therefore important to guarantee the precision of the position of the electrical edges of the signal generated by the sensor with respect to the position of the mechanical edges of the target. Since each of its electrical edges is indicative of the passage of the mechanical edges of one tooth, the objective is to minimize the phase shift in the signal caused by the fact that the sensor and the target are variably separated from one another.

The electrical signal generated by the sensor changes (high or low) state when the magnetic signal crosses a predetermined switching threshold proportional to its amplitude. To this end, this switching threshold is set, preferably to 75% of the amplitude, this corresponding to an optimum with respect to the precision between electrical edges and mechanical edges for most existing targets, but this threshold may for example vary between 70% and 80% depending on the precision with which it is desired to determine the time of passage of each of the edges defining one tooth.

Thus, as soon as a first maximum and a first minimum of the perceived magnetic field are detected, it is determined which switching-threshold value corresponds to 75% of this amplitude, and a falling edge is detected if the measured value of the magnetic field drops below this threshold value and, conversely, a rising edge is detected if the measured value of the magnetic field rises above this switching-threshold value (or vice versa). By proceeding in this manner, the moment of detection of the edge is optimized.

However, magnetic sensors have the drawback of being sensitive to the position of the target on the member (the camshaft for example) bearing it, to the geometry of this target; and to the actual temperature in proximity to the sensor, which may cause the magnetic gap between the target and the sensor to vary (the gap may also vary over the service life of the sensor).

In addition, this specifically falling within the scope of use of the present invention, the magnetic signal may be modified by external magnetic disturbances, this being an increasingly frequent occurrence given that the powertrain of motor vehicles is increasingly electrified or that motor vehicles increasingly include electronic devices that emit parasitic magnetic fields.

It is known in the prior art to calibrate the magnetic-field sensor and thus to deliver a corrected measurement that ensures a better precision as regards electrical edges/mechanical edges and that removes the risk of non-detection of a tooth to the central computer of the electronic control unit responsible for determining the position of each cylinder in the engine cycle.

To this end, the switching threshold is recomputed after the passage of the maximum and minimum of consecutive teeth, depending on the new amplitude of the magnetic field on each passage of a tooth in front of the sensor.

With reference to FIG. 1, this figure shows the profile of a tooth DC of a mechanical target above two amplitude signals as a function of time. The configuration of the tooth of the mechanical target is of rectangular shape, a detection plateau being generated thereby, such a plateau being present for each tooth of the target, the target possibly being circular and the teeth DC possibly being distributed circumferentially on a periphery of the target.

The first signal resulting from the detection of the tooth is the magnetic detection signal Smag sensed by the magnetic-field sensor. This magnetic detection signal Smag on the whole traces the profile of the tooth DC, varying from 0 to 100% when a tooth is detected, one of the differences being that the rise in detection is less abrupt than the profile of the tooth DC, and another being that the detection plateau of the magnetic detection signal Smag does not remain constant during detection, unlike the plateau of the tooth DC.

To make the detection interval of the magnetic detection signal Smag equivalent to the plateau of the tooth, a switching threshold SC, which may be equal between 70 and 80% of the maximum detection amplitude, 0% corresponding to no detection and 100% corresponding to complete detection, is established.

The second signal is an electrical output signal Ss delivered by the magnetic-field sensor to an electronic control unit, this corresponding to an indication that the switching threshold SC has been reached, and having a plateau representing the time for which the magnetic signal Smag remains above this switching threshold SC.

With reference to FIGS. 5 to 7 and 8 to 10, FIGS. 5 to 7 show low-frequency parasitic magnetic oscillations and FIGS. 8 to 10 high-frequency parasitic magnetic oscillations, which oscillations are sensed by the sensor and present in the magnetic signal.

FIG. 5 illustrates an ideal, filtered magnetic signal Smag and a magnetic signal Smagr that is actually received by the sensor. The magnetic signal Smagr that is actually received comprises a succession of parasitic oscillations: in this figure, low-frequency parasitic oscillations two of which oscillations have maxima aM, bM and minima am, bm. In the prior art, the update of the switching threshold SC is triggered only after detection of a predetermined number of consecutive maxima or consecutive minima, in the present case 4 for example; since the maxima aM and bM are 2 in number, i.e. less than 4, the switching threshold SC is not updated.

FIG. 6 shows the electrical signal Ssr emitted in the end by the sensor and FIG. 7 shows the ideal electrical signal Ssi, the two signals Ssr and Ssi being similar. Low-frequency parasitic oscillations are therefore not a problem, because they do not affect, with the prior-art method for updating the switching threshold, precision as regards the position of the teeth, and therefore the precision of the sensor.

FIG. 8 is similar to FIG. 5 except that the parasitic oscillations are high-frequency. In these oscillations, there may be oscillations that are due to magnetic disturbances, which are not to be taken into account in the update of the switching threshold, and oscillations that are due to the operation of the engine, and which are therefore to be taken into account.

However, the prior-art updating method is unable to differentiate between oscillations originating from magnetic disturbances and oscillations originating from the operation of the engine (from the passage of the teeth). In other words, in the prior art, above a predetermined number of consecutive detected maxima or minima, the switching threshold SC is updated.

FIG. 8 shows, for certain of the successive high-frequency oscillations, their respective maximum aM, bM, cM and dM and minimum am, bm, cm and dm. According to the prior-art method, after the passage of the four consecutive maxima, aM, bM, cM and dM, a new average maximum Max is computed. Likewise, after the passage of the four consecutive minima, am, bm, cm and dm, a new average minimum Min is computed. The average maximum Max and average minimum Min are then taken into account in the update of the switching threshold SC—they are also illustrated in the form of a respective straight horizontal line that together more or less flank the oscillations.

FIG. 9 shows the electrical signal Ssr output from the sensor, according to the new switching threshold thus computed, and FIG. 10 shows the ideal electrical signal Ssi, which is no longer similar to the electrical signal Ssr output from the sensor: the electrical signal Ssr comprises a succession of crenels, corresponding to high-frequency parasitic oscillations and not representative of the passage of the teeth. Said electrical signal Ssr is therefore incorrect.

In the presence of high-frequency parasitic oscillations, a false output signal is delivered to an electronic control unit during this phase of vibrations and there is a possible calibration of the sensor that results in computation of an erroneous switching threshold, this distorting the precision of the sensor.

The problem behind the present invention is, for a magnetic-field sensor associated with an internal combustion engine with a view to synchronizing this internal combustion engine with an electronic control unit of a motor vehicle, that of avoiding a decrease in the precision of the magnetic-field sensor while ensuring updates of the switching threshold of the sensor, the computation of which is not distorted by taking into account high-frequency magnetic disturbances in the oscillations of the magnetic signal.

SUMMARY OF THE INVENTION

An aspect of the invention relates to a method for authorizing an update of a switching threshold of a magnetic-field sensor for an internal combustion engine of a motor vehicle, in order to ensure an immunity of the sensor to external magnetic disturbances, a target comprising an alternating succession of teeth and of recesses being associated with an element of the internal combustion engine and the magnetic-field sensor detecting magnetic-field variations induced by a passage of the teeth of the target in proximity to the sensor by generating, from said variations, a magnetic signal exhibiting oscillations each having an amplitude comprised between a maximum and a relative minimum, certain of the oscillations possibly being due to magnetic disturbances and being not to be taken into account in the update by the sensor of the switching threshold, which is recomputed depending on a detected amplitude of at least two consecutive magnetic-field oscillations, noteworthy in that the update of the switching threshold is suspended when an oscillation frequency computed between said at least two consecutive oscillations is higher than a maximum oscillation frequency computed depending on a maximum speed of rotation of the engine and on the number of teeth on the target.

The technical effect is to trigger an update of a switching threshold only on the basis of oscillations relating to the operation of the engine, during a modification of the average maximum or the average minimum used to generate the switching threshold.

To this end, the solution proposed by an aspect of the present invention consists in authorizing or not the updates of the average minima and maxima depending on an oscillation-frequency plausibility dependent on the number of teeth of the mechanical target and on the maximum speed of rotation of the engine.

Thus, an aspect of the invention makes provision to not consider, in the update of the switching threshold, all the high-frequency oscillations the oscillation frequency of which, between two successive oscillations, is higher than a maximum oscillation frequency.

Such oscillations are certainly not caused by the operation of the engine and are thus easily identified, and an update on the basis of such parasitic oscillations essentially due to magnetic disturbances is suspended because it is obviously incorrect.

The predetermined speed of rotation of the engine or engine speed is calibratable and selected according to the wishes of the manufacturer of the internal combustion engine. If this predetermined speed is too high, magnetic disturbances may be unidentified and if this speed is too low, the suspension of updates becomes too selective. Its selection depends on the engine and is something that is within the ability of a person skilled in the art to do.

Advantageously, an update of the switching threshold is consecutive to an update of an average maximum and/or an average minimum, an update of at least one average maximum or one average minimum being suspended when an oscillation frequency computed between at least two consecutive oscillations is higher than a maximum oscillation frequency.

Aptly, when one of the oscillations of a group of a predetermined number of oscillations has an oscillation frequency, computed from a directly preceding oscillation, higher than the maximum oscillation frequency, the update of the switching threshold is suspended for the group. The predetermined number may be equal to four.

According to an aspect of the invention, the sensor periodically delivers an electrical output signal to an electronic control unit with a view to synchronizing the internal combustion engine, the electrical output signal indicating a position of a current value of the magnetic signal with respect to the switching threshold, which is periodically recomputed by said sensor.

An aspect of the invention also relates to an assembly of at least one magnetic-field sensor, for an internal combustion engine of a motor vehicle, and of an electronic control unit, said at least one sensor interacting with a target comprising an alternating succession of teeth and of recesses, which target is associated with an element of the internal combustion engine, and said at least one magnetic-field sensor comprising means for detecting magnetic-field variations induced by the passage of the teeth of the target in proximity to said at least one sensor, said at least one sensor comprising means for generating a magnetic signal from said variations, said at least one sensor comprising means for computing and updating a switching threshold, and means for periodically transmitting an electrical output signal to the electronic control unit with a view to synchronizing the internal combustion engine, the assembly implementing a method as claimed in any one of the preceding features, noteworthy in that said at least one sensor comprises means for computing an oscillation frequency between at least two consecutive oscillations in the magnetic signal, means for storing a maximum oscillation frequency computed from a calibratable predetermined speed of rotation of the engine and from the number of teeth on the target, means for comparing the oscillation frequency and the maximum oscillation frequency and means for suspending the update of the switching threshold when the oscillation frequency is higher than the maximum oscillation frequency.

Preferably, the magnetic-field sensor is a camshaft sensor and/or a crankshaft sensor of the internal combustion engine.

Lastly, an aspect of the invention applies to any motor vehicle, comprising an assembly of at least one magnetic-field sensor and of an electronic control unit as claimed in any one of the preceding features.

Such an assembly meets a demand of motor-vehicle manufacturers, who wish, because of the increasing electrification of motor vehicles, to increase magnetic immunity.

An update of the average maxima and minima to reflect the minima or maxima of magnetic-field oscillations, and consequently of the threshold of switching to a magnetic disturbance, is thus prevented via software means, and therefore means not involving the extra cost of additional components. Missing pulses and/or generation of additional pulses is thus avoided during the emission of one or more magnetic disturbances.

Advantageously, said at least one magnetic-field sensor is a camshaft sensor and/or a crankshaft sensor of the internal combustion engine.

An aspect of the invention lastly relates to a motor vehicle that is noteworthy in that it comprises such an assembly of at least one magnetic-field sensor and of an electronic control unit.

BRIEF DESCRIPTION OF THE DRAWINGS

Other features and advantages of aspects of the invention will become more apparent upon reading the following description. This description is purely illustrative and must be read with reference to the attached drawings, in which:

FIG. 11 shows another example of oscillations of an actually received magnetic signal comprising high-frequency oscillations and of updates of the average maximum and minimum, and therefore updates of the switching threshold, according to the prior art.

DETAILED DESCRIPTION OF THE PREFERRED EMBODIMENTS

Figure 5:
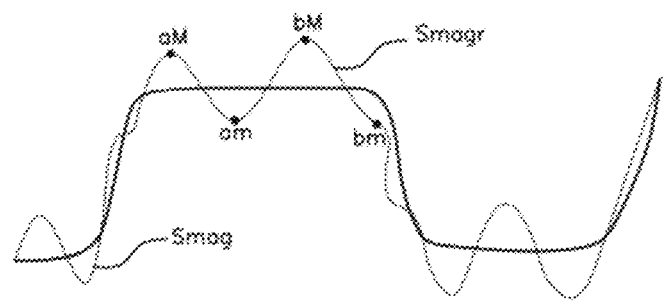
FIG. 5 shows an ideal, filtered magnetic signal and an actually received magnetic signal comprising low-frequency parasitic oscillations.
Figure 6:
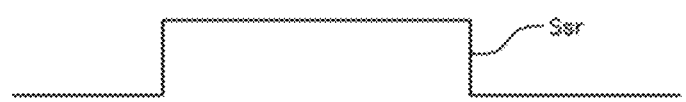
FIG. 6 shows an electrical output signal of the sensor for the actually received signal of FIG. 5.
Figure 7:
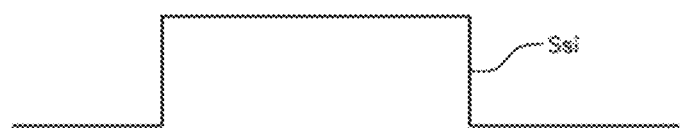
FIG. 7 shows an ideal electrical output signal of the sensor for the ideal, filtered magnetic signal of FIG. 5.

FIGS. 5 to 7 show the actually received magnetic signal Smagr comprising low-frequency parasitic oscillations. The low-frequency oscillations do not cause an update of the switching threshold SC in the prior-art method, because the number of consecutive maxima detected or the number of consecutive minima detected per tooth does not exceed a predetermined number, 4 in the case of the present example. Of course, the predetermined number may be 2 or any other value.

Figure 8:
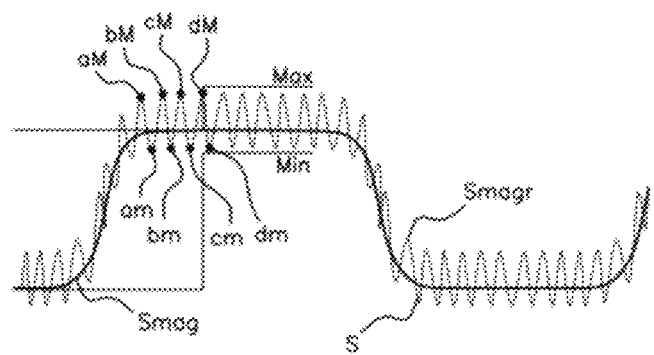
FIG. 8 shows an ideal, filtered magnetic signal and an actually received magnetic signal comprising high-frequency parasitic oscillations.
Figure 9:
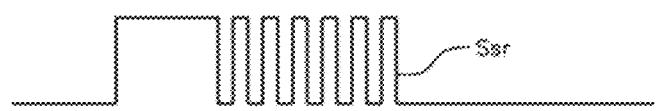
FIG. 9 shows an electrical output signal of the sensor for the actually received magnetic signal shown in FIG. 8, according to the prior art.
Figure 10:
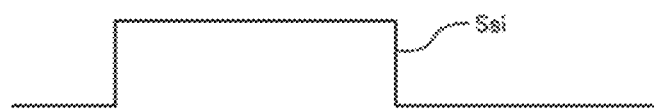
FIG. 10 shows an ideal electrical output signal of the sensor for the ideal, filtered magnetic signal shown in FIG. 8.

In contrast, as shown in FIGS. 8 to 10, high-frequency parasitic oscillations lead to updates of the switching threshold, in the prior-art method, as soon as the number of consecutive maxima detected or the number of consecutive minima detected exceeds a predetermined number, 4 in the case of the present example, this possibly leading to a plurality of switching-threshold updates on a single tooth. This leads to a completely erroneous tooth-passage-detection electrical signal Ssr.

Figure 1:
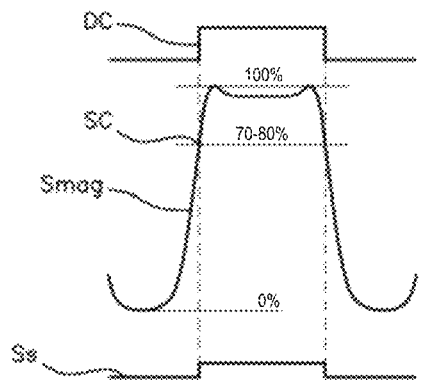
FIG. 1, which was described above, consists of a group of three curves showing the configuration of a tooth of a mechanical target for a magnetic-field sensor, the target-detection magnetic signal delivered by the magnetic-field sensor and the electrical output signal delivered by the magnetic-field sensor for an external entity, especially for an electronic control unit, the magnetic-field sensor possibly being intended for an internal combustion engine and being common to the prior art and to an aspect of the present invention.
Figure 2:
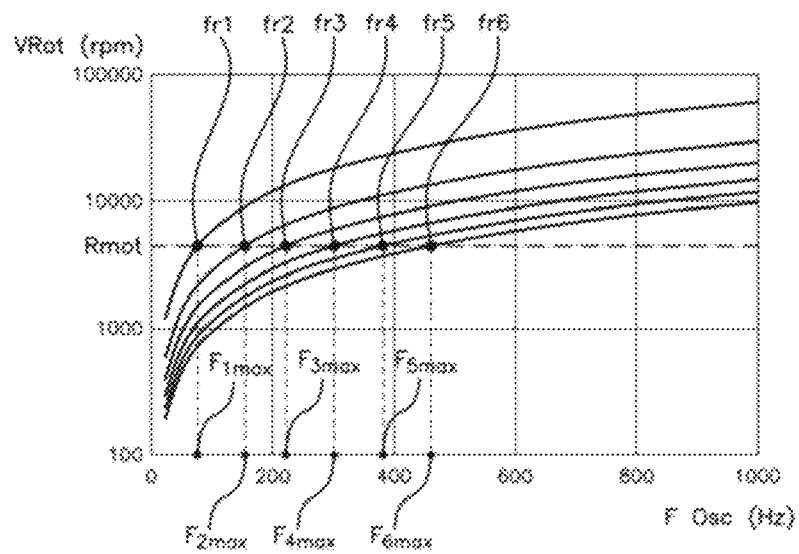
FIG. 2 shows, according to an aspect of the invention, curves of the oscillation frequency of a magnetic signal for targets of one to six teeth as a function of the speed of rotation of the engine, a predetermined maximum engine speed being indicated, for which speed, for a curve associated with a target having a specific number of teeth, any oscillation frequency higher than the point of intersection of each curve with the predetermined maximum speed is due to a high-frequency magnetic disturbance and is to not be taken in consideration in an update of a switching threshold.

With reference to all the figures, and in particular to FIGS. 1 and 2, an aspect of the present invention relates to a method for authorizing an update of a switching threshold of a magnetic-field sensor for an internal combustion engine of a motor vehicle, in order to ensure an immunity of the sensor to high-frequency external magnetic disturbances. By "high-frequency" what is meant is any external-magnetic-disturbance frequency higher, as will be described below, than the maximum magnetic-signal oscillation frequency, in any given configuration of the number of teeth on the target, at any engine speed.

As indicated in the introductory part of the present application, a target comprising an alternating succession of teeth DC and of recesses is associated with an element of the internal combustion engine, for example a camshaft or a crankshaft.

The magnetic-field sensor detects magnetic-field variations induced by a passage of the teeth DC of the target in proximity to the sensor by generating, from said variations, a magnetic signal exhibiting oscillations each having an amplitude comprised between a maximum and a relative minimum.

As mentioned above, certain of the oscillations are possibly due to parasitic magnetic disturbances and are not to be taken into account in the update by the sensor of the switching threshold SC.

This update is performed depending on a detected amplitude of a predetermined number of oscillations, for example at least four consecutive oscillations of the magnetic field, i.e. on the basis of, either four consecutive detected maxima, i.e. four maximum values above or below the last computed average maximum, or four consecutive detected minima, i.e. four minimum values above or below the last computed average minimum.

According to an aspect of the present invention, the update of the switching threshold is suspended when a frequency Fosc of consecutive oscillations in the actually received magnetic signal is higher than a maximum oscillation frequency fr1, fr2, fr3, fr4, fr5, fr6 computed depending on the number of teeth (1, 2, 3, 4, 5, and 6, respectively) on the target, and on a maximum speed of rotation Rmot of the engine (or maximum engine speed).

The maximum speed of rotation Rmot of the engine is predetermined so that oscillations due to high-frequency magnetic disturbances are not taken into consideration, and so that the switching threshold is not updated when such magnetic disturbances are detected.

The maximum oscillation frequency fr1 . . . fr6 takes into account the number of teeth (from 1 to 6 in FIG. 2) present on the target. Specifically, the oscillations present in the magnetic signal are proportional to the number of teeth on the target, and to the speed of rotation of the engine.

FIG. 2 shows a graph the x-axis of which represents the frequencies F Osc of the oscillations in the magnetic signal in hertz, and the y-axis of which represents, on a logarithmic scale, the speed of rotation Vrot of the internal combustion engine, or engine speed, in revolutions per minute (rpm). A number of curves of the frequency of oscillations in the magnetic signal have also been shown, for targets comprising from one to six teeth (six teeth-related curves).

A predetermined maximum engine speed or speed of engine rotation Rmot is set, this speed being around 5,000 revolutions/minute in the graph, this value being non-limiting.

Such a predetermined speed of rotation Rmot may be stored in an electrically erasable programmable read-only memory (EEPROM). The EEPROM register may be programmable in order to be able to correspond to the various specifications of a vehicle manufacturer as regards the predetermined speed of rotation Rmot of the engine that allows, with the number of teeth on the target, the maximum frequency of oscillations in the magnetic signal to be computed.

The points fr1 to fr6, which correspond to a target comprising one to six teeth, respectively, show the maximum frequency, of oscillations in the magnetic signal, for which an update of a switching threshold will be authorized, for a respective number of teeth on the target.

For example, for a target with one tooth, a frequency greater than the projection F1max of fr1 onto the x-axis representing the frequencies Fosc is surely due to a high-frequency parasitic magnetic disturbance and is to not be taken into consideration in an update of the switching threshold.

The same goes for frequencies higher than the projections F2max, F3max, F4max, F5max, F6max of the points fr2 to fr6 onto the axis representing the frequencies Fosc, which correspond to respective targets of two to six teeth.

Figure 3:
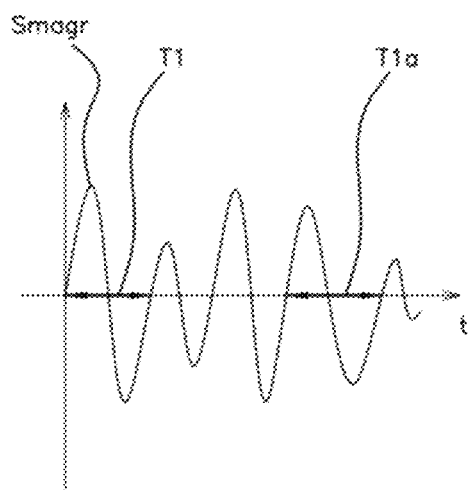
FIG. 3 shows a magnetic signal actually received by the sensor with oscillations of various amplitudes and of various periods.

FIG. 3 shows, as a function of a time t, a non-limiting example of a magnetic signal Smagr actually received by the sensor with oscillations of various amplitudes and of various periods. The two left-most oscillations have between them a period T1 whereas the two right-most oscillations have between them a longer period T1*a*. The resulting frequencies of the two oscillation pairs are the inverse of the periods T1 and T1*a*.

Figure 4:
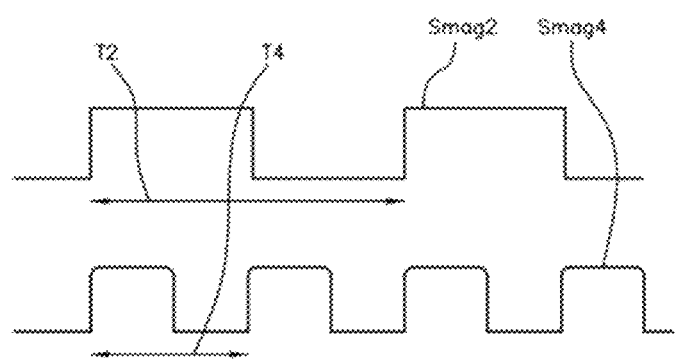
FIG. 4 illustrates a comparison between a processed magnetic signal for a target with two teeth and for a target with four teeth.

FIG. 4 shows, one above the other, an ideal processed magnetic signal Smag2 and Smag4 for a target with two teeth and a target with four teeth, respectively. The periods of the processed magnetic signals Smag2 and Smag4 are T2 and T4, respectively, and their frequencies are the inverse of a respective period T2 or T4.

It is therefore the frequencies of the oscillations in the actually received magnetic signal, which oscillations are illustrated in FIG. 3, that are compared to a maximum frequency of oscillations in the ideal magnetic signal, which maximum frequency is computed depending on the number of teeth on the target (see FIG. 4) and on a maximum speed of rotation Rmot of the engine.

The switching threshold is updated consecutive, as explained above, to an update of an average maximum and/or an average minimum of said oscillations following detection of a predetermined number, 4 for example, of consecutive minima or consecutive maxima that are different (above or below) from the previously computed average minimum or from the previously computed average maximum, respectively—this is illustrated in FIGS. 8 and 11. Of course, a margin of error may be applied when computing the difference between each detected maximum and the last computed average maximum and when computing the difference between each detected minimum and the last computed minimum.

According to an aspect of the invention, an update of at least one average maximum or one average minimum is suspended when an oscillation frequency Fosc computed between said at least two consecutive oscillations is higher than the maximum oscillation frequency F1max . . . F6max.

The oscillation frequency may be computed over at least one target revolution. However, this is not limiting.

According to the prior art, with reference more particularly to FIG. 11, consecutive oscillations trigger an update of the threshold only when four consecutive minima or four consecutive maxima are detected as being above or below the last computed average minimum or last computed average maximum. This is the case for:
 the update of the average minimum Min, following detection of em, fm, gm, and hm as being minima below the last computed average minimum Min,
 the update of the average minimum, following detection of km, lm, mm, nm as being minima below the last computed average minimum Min,
 the update of the average maximum, following detection of kM, lM, mM, nM, as being maxima above the last computed average maximum Max. In all other cases, there is no update of the threshold.

In contrast to this prior-art method, and according to an aspect of the invention, the frequency Fosc of the oscillations in the magnetic signal is computed and compared to a maximum oscillation frequency F1max . . . F6max in order to authorize, or not, the update of the average minimum and maximum and therefore of the switching threshold SC.

In FIG. 11, starting from the left, it may be seen that, considering consecutive oscillations, there is only one maximum aM that warrants a decrease in the average maximum Max previously used for the computation of the switching threshold. As this maximum aM alone warrants a decrease, the following two other oscillations not being below the average maximum Max but equal to the average maximum Max, the average maximum Max is not updated.

Next, further to the right, it may be seen that there are two consecutive oscillations with minima am, bm that warrant an increase in the average minimum Min, and two maxima bM and cM that warrant a decrease in the average maximum Max. The average maximum Max and the average minimum Min are not then updated, because there are not four such consecutive oscillations in both cases. The same goes for the switching threshold.

Still further to the right, three oscillations have maxima fM, gM and hM above the average maximum Max. The three aforementioned oscillations plus a fourth consecutive oscillation have minima em, fm, gm and hm below the average minimum Min. The average minimum Min is then updated, decreasing it. The same goes for the switching threshold.

Next, two consecutive oscillations have maxima iM and jM below the average maximum Max and minima im and jm above the average minimum Min. The average maximum Max and the average minimum Min are not then updated, because there are not four such consecutive oscillations in both cases. The same goes for the switching threshold.

The next four oscillations further to the right have four consecutive maxima kM, lM, mM, nM above the average maximum Max and four consecutive minima km, lm, mm, nm below the average minimum Min. An update is then carried out, decreasing the average minimum Min and increasing the average maximum Max. The same goes for the switching threshold, even though the two corrections, to the average maximum and to the average minimum, are in opposite directions.

Finally, considering the right-most oscillations, one oscillation has a maximum oM equal to the updated average maximum Max and one oscillation has a minimum om equal to the also updated average minimum Min. A single oscillation is an insufficient reason to update the average maximum Max and the average minimum Min.

When one of the oscillations of a group has an oscillation frequency Fosc, computed from a directly preceding oscillation, higher than the maximum possible oscillation frequency F1max . . . F6max, the update of the switching threshold may is suspended for the group of four oscillations.

The sensor periodically delivers an electrical output signal Ss to an electronic control unit with a view to synchronizing the internal combustion engine. As shown in FIG. 1, the electrical output signal Ss indicates a position of a current value of the magnetic signal Smag with respect to the switching threshold SC, which is periodically recomputed by said sensor.

With reference to all the figures, an aspect of the invention relates to an assembly of at least one magnetic-field sensor, for an internal combustion engine of a motor vehicle, and of an electronic control unit.

The one or more magnetic-field sensors 1 interact with a target comprising an alternating succession of teeth DC and of recesses, which target is associated with an element of the internal combustion engine.

The one or more magnetic-field sensors 1 comprise means for detecting magnetic-field variations induced by the passage of the teeth DC of the target in proximity to said at least one sensor. In addition, the one or more sensors 1 comprise means for generating a magnetic signal Smag from said variations.

The one or more sensors 1 comprise means for computing and updating a switching threshold SC, and the one or more sensors 1 comprise means for periodically transmitting an electrical output signal Ss to the electronic control unit with a view to synchronizing the internal combustion engine.

In order for such an assembly to be able to implement a method for authorizing an update of a switching threshold of a magnetic-field sensor for an internal combustion engine, the one or more sensors 1 comprise means for computing an oscillation frequency Fosc between at least two consecutive oscillations in the magnetic signal, means for storing a maximum oscillation frequency computed from a calibratable predetermined speed of rotation Rmot of the engine and from the number of teeth on the target, and means for comparing the frequency of oscillations in the magnetic signal and the maximum oscillation frequency F1max, F2max . . . F6max.

Lastly, and above all, the one or more sensors 1 comprise means for suspending the update of the switching threshold when the oscillation frequency for at least two oscillations is higher than the maximum oscillation frequency.

In one preferred application, the one or more sensors may be a camshaft sensor and/or a crankshaft sensor of the internal combustion engine.

An aspect of the invention lastly relates to a motor vehicle comprising such an assembly of at least one magnetic-field sensor and of an electronic control unit.

This vehicle may advantageously be a hybrid vehicle because magnetic disturbances are substantial in this type of vehicle.

The invention claimed is:

1. A method for authorizing an update of a switching threshold of a magnetic-field sensor for an internal combustion engine of a motor vehicle, for use with a target comprising an alternating succession of teeth and recesses being associated with an element of the internal combustion engine, the method comprising:
    detecting, by the magnetic-field sensor, magnetic-field variations induced by a passage of the teeth of the target in proximity to the sensor by:
        generating, from said variations, a magnetic signal exhibiting oscillations each having an amplitude comprised between a maximum and a relative minimum, certain of the oscillations being due to high-frequency external magnetic disturbances and not taking into account the high-frequency external magnetic disturbances in the update of the switching threshold by the sensor, wherein the high-frequency external magnetic disturbances comprise any external magnetic disturbance frequency higher than a maximum oscillation frequency at any engine speed, said maximum oscillation frequency being computed from a calibratable predetermined speed of rotation of the engine,
    recomputing the switching threshold depending on a detected amplitude of at least two consecutive magnetic-field oscillations, and
    comparing an oscillation frequency computed between said at least two consecutive oscillations to the maximum oscillation frequency computed based on a maximum speed of rotation of the engine and on a number of teeth on the target,
    suspending the update of the switching threshold when the oscillation frequency is higher than the maximum oscillation frequency, and
    providing an immunity of the sensor to the high-frequency external magnetic disturbances based on the recomputed switching threshold.

2. The method as claimed in claim 1, wherein, when one of the oscillations of a group of a predetermined number of oscillations has an oscillation frequency, computed from a directly preceding oscillation, higher than the maximum oscillation frequency, the update of the switching threshold is suspended for the group.

3. The method as claimed in claim 2, wherein the predetermined number is equal to four.

4. The method as claimed in claim 1, wherein the sensor periodically delivers an electrical output signal to an electronic control unit with a view to synchronizing the internal combustion engine, the electrical output signal indicating a position of a current value of the magnetic signal with respect to the switching threshold, which is periodically recomputed by said sensor.

5. An assembly of at least one magnetic-field sensor, for an internal combustion engine of a motor vehicle, and of an electronic control unit, said at least one sensor interacting with a target comprising an alternating succession of teeth and of recesses, which target is associated with an element of the internal combustion engine, and said at least one magnetic-field sensor comprising means for detecting magnetic-field variations induced by the passage of the teeth of the target in proximity to said at least one sensor, said at least one sensor comprising means for generating a magnetic signal from said variations, said at least one sensor comprising means for computing and updating a switching threshold, and means for periodically transmitting an electrical output signal to the electronic control unit with a view to synchronizing the internal combustion engine, the assembly implementing a method as claimed in claim 1, wherein said at least one sensor comprises means for computing an oscillation frequency between at least two consecutive oscillations in the magnetic signal, means for storing a maximum oscillation frequency computed from a calibratable predetermined speed of rotation of the engine and from the number of teeth on the target, means for comparing the oscillation frequency and the maximum oscillation frequency and means for suspending the update of the switching threshold when the oscillation frequency is higher than the maximum oscillation frequency.

6. The assembly as claimed in claim 5, wherein said at least one magnetic-field sensor is a camshaft sensor and/or a crankshaft sensor of the internal combustion engine.

7. A motor vehicle, comprising an assembly of at least one magnetic-field sensor and of an electronic control unit as claimed in claim 5.

8. A motor vehicle, comprising an assembly of at least one magnetic-field sensor and of an electronic control unit as claimed in claim 6.

* * * * *